Feb. 28, 1967  T. L. BEACH, JR  3,306,565
MOUNTING BRACKET FOR MIRROR
Filed March 8, 1965  2 Sheets-Sheet 1
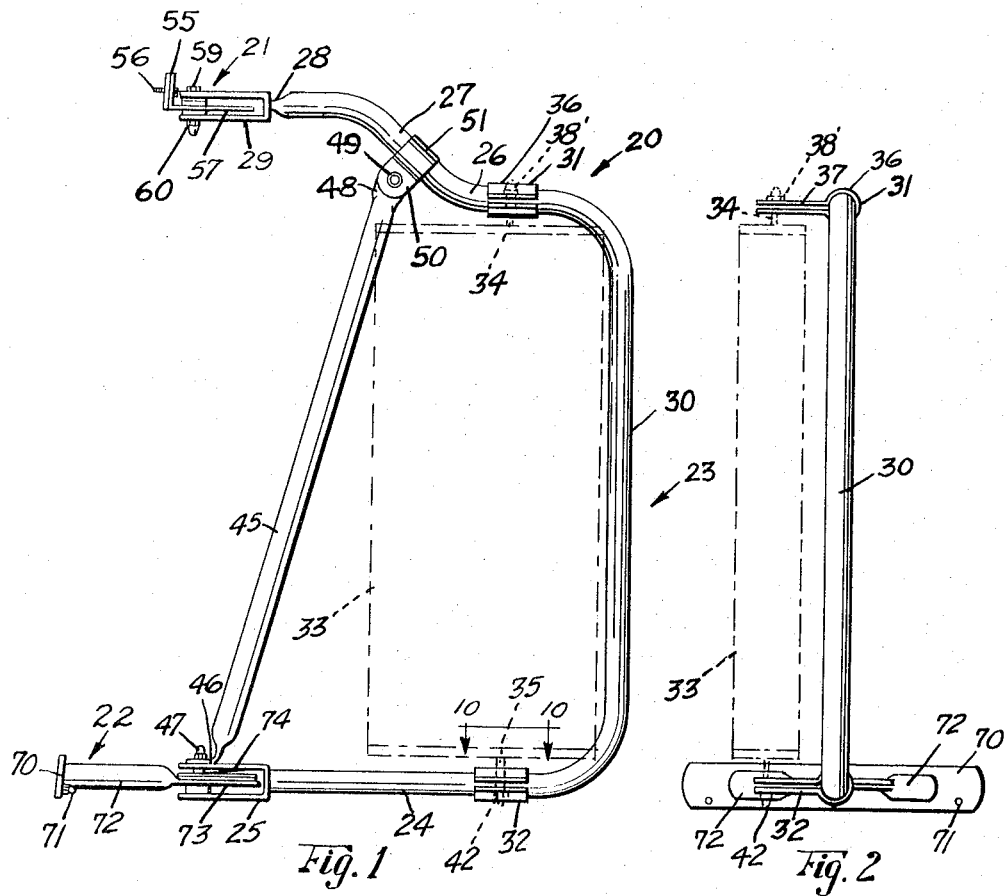
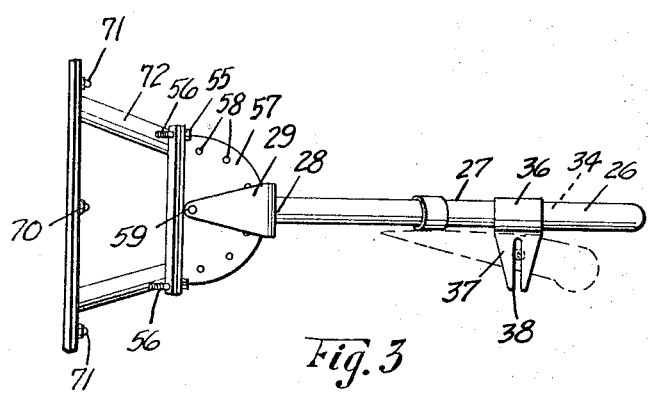
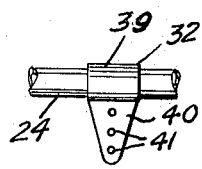
INVENTOR
THEODORE L. BEACH, JR.
BY
ATTORNEYS

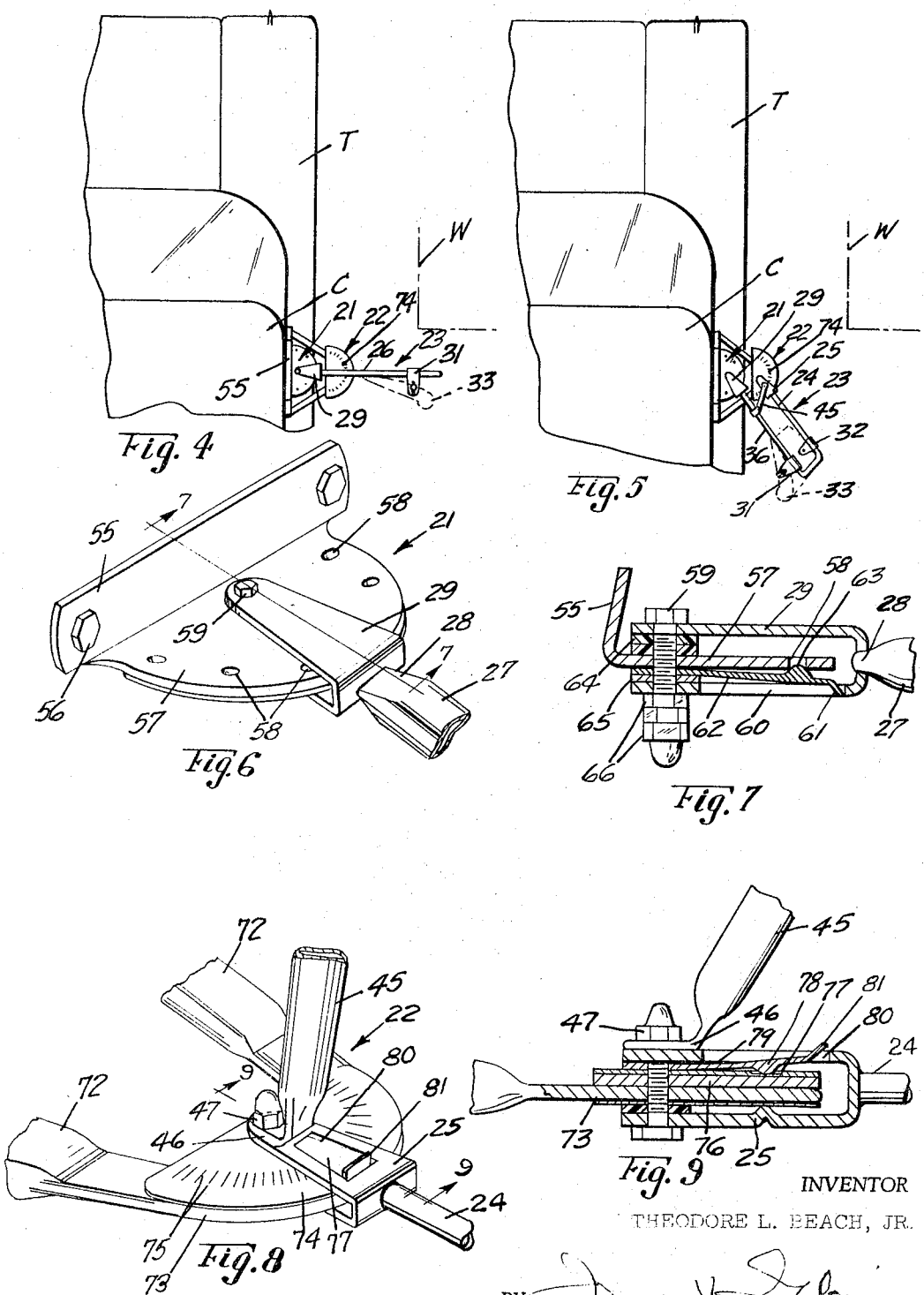

United States Patent Office 3,306,565
Patented Feb. 28, 1967

3,306,565
MOUNTING BRACKET FOR MIRROR
Theodore Louis Beach, Jr., Box 366,
Donnelsville, Ohio 45319
Filed Mar. 8, 1965, Ser. No. 438,017
8 Claims. (Cl. 248—282)

This invention relates to a mirror mounting bracket, and has particular applicability to a rear view mirror mounting for trucks, and more particularly to such a mounting which extends well out from the cab of the truck so as to permit rear vision beyond the wide sides of a truck body or trailer.

A primary object of this invention is the provision of an improved mirror mounting bracket of this nature within which the mirror may be pivoted or swivelled to a desired angle, and wherein the entire bracket assembly may be swung inwardly relative to the sides of the vehicle, in order to permit passage of the vehicle through a restricted area.

A further object of the invention is the provision of such a device provided with a plurality of detent means whereby the mirror, when swung to a selected position of adjustment by means of the movable bracket, may be retained in such position until manually moved.

A further object of the invention is the provision of calibration means on the lower portion of the mounting bracket whereby the degree of angular adjustment necessary may be readily determined.

Still another object of the invention is the provision of a device of this character which is resiliently secured in a fixed position of adjustment, by means of the detents associated therewith, yet which may be readily moved by the application of pressure against the bracket to swing the device about a selected arc.

Still other objects of the invention reside in the combinations of elements, arrangement of parts, and features of construction.

A further object of the invention is the provision of a device of this nature which is sturdy and durable in construction, reliable and efficient in operation, and relatively simple and inexpensive to manufacture and install.

Still other objects will in part be obvious and in part be pointed out as the description of the invention proceeds, and shown in the accompanying drawings wherein there is disclosed a preferred embodiment of this inventive concept.

In the drawings:

FIGURE 1 is an elevational view of one form of mounting bracket embodying the instant inventive concept;

FIGURE 2 is an end elevational view of the structure of FIGURE 1;

FIGURE 3 is a top plan view thereof;

FIGURE 4 is a top plan view of the device of FIGURE 1 shown as attached to the side of a vehicle body in one position of adjustment;

FIGURE 5 is a view similar to FIGURE 4 showing the apparatus in a different position of adjustment;

FIGURE 6 is a perspective view of a constructional detail;

FIGURE 7 is a sectional view taken substantially along line 7—7 of FIGURE 6, as viewed in the direction indicated by the arrows;

FIGURE 8 is an enlarged perspective view of an additional constructional detail;

FIGURE 9 is an enlarged sectional view taken substantially along line 9—9 of FIGURE 8 as viewed in the direction indicated by the arrows; and, FIGURE 10 is a sectional view taken substantially along line 10—10 of FIGURE 1 as viewed in the direction indicated by the arrows.

Similar reference characters refer to similar parts throughout the several views of the drawings.

Referring to the drawings, the bracket of the instant invention is generally indicated at 20 and includes an upper support generally indicated at 21, a lower support generally indicated at 22, and a mirror supporting frame generally indicated at 23. Referring first to the mirror supporting frame, the latter is comprised of a lower normally horizontal arm 24 which is provided at one end with a clevis 25, an upper supporting arm 26 which includes an angularly offset portion 27 and a reduced end 28, to which is secured a second clevis 29, and a normally substantially vertical bight or side arm 30. Upper and lower spring clips 31 and 32 are provided for the support of a mirror 33 which includes upper and lower mounting pins 34 and 35. The upper bracket, as best shown in FIGURE 3, includes a substantially circular portion 36 which encircles the upper arm 26, and a pair of transversely extending projections 37 provided with elongated slots 38 in which the upper pin 34 is adjustably secured by means of clamping nuts 38'. The lower portion of the supporting frame is similar in general construction and includes a circular portion 39 which surrounds lower arm 24, and a pair of transversely extending spaced portions 40 provided with spaced openings 41 for the selective reception of lower pin 35. Clamping nuts 42 serve to secure the lower mirror mounting pin in position.

Frame 23 is provided with an angularly disposed support 45, the lower end of which is flattened and offset as at 46, and mounted on a pivot 47, which extends through clevis 25 and which will be more fully described hereinafter. The other end of support 45 is flattened as at 48 and pivoted as by means of pivot 49 between a pair of offset flattened portions 50 extending from a cylindrical collar 51 which encircles the offset portion 27 of upper arm 26. The purpose of this mounting will be more fully described hereinafter.

Upper support 21 includes a plate-like member 55 which is secured as by bolts 56 to the cab C of a truck T, as shown in FIGURES 4 and 5, and so arranged as to afford rear visibility to the driver of the truck. Plate 55 has secured at right angles thereto a semicircular flange or plate 57, which is provided with a series of annular spaced recesses 58. Clevis 29 is pivotally mounted on a pivot 59 which is concentric with the semicircular disc 57 and the disc extends between the arms of the clevis. Lower portion of clevis 29 has an opening 60 therein, through which protrudes a spring finger 61, as best shown in FIGURE 7, which is attached to a spring arm 62 which has on its upper surface a detent 63 which is adapted to engage selectively in one of the recesses 58 in plate 57. Resilient washers 64 and 65 are positioned on pivot bolt 59 on opposite sides of plate 57 and the entire assembly is held in pivotal relation by lock nuts 66.

Lower support 22 consists of a vertical flange 70 which is adapted to be secured to vehicle body by bolts 71 and which is provided with a pair of outwardly extending converging arms 72. Arms 72 merge into a continuous arcuate flattened end portion 73, upon which is mounted a semicircular plate 74 having graduations 75 thereon. Plate 74 is carried on a supplementary semicircular plate 76 and is provided with a recess 77, which is adapted to be engaged by a detent 78 on a spring arm 79 carried between the legs of clevis 25. A top opening 80 in the clevis permits a spring finger 81 integral with arm 79 to project therefrom, the finger being adapted when lifted to disengage detent 78 from its associated recess.

The arrangement is thus such that in normal use the bracket assembly may be positioned as shown in FIGURE 4 with the mirror supporting frame extending substantially at right angles to the vehicle body. However, when it is necessary to pass between a pair of walls W, or closely adjacent one wall, the entire assembly may be tilted to the rear as shown in FIGURE 5. This may be effected simply by grasping the frame and moving the assembly to the position of FIGURE 5, detents 63 and 78 riding out of their associated detent recesses, or alternatively, fingers 61 and 81 may be lifted for the purpose of releasing the detents. When the device is angled rearwardly as shown in FIGURE 5 due to the relatively offset position of supports 21 and 22, the entire frame is tilted downwardly and rearwardly, so that the same may function as a rear view mirror and disclose the terrain or ground immediately adjacent the rear wheels of the truck. This feature is particularly useful when backing the truck.

From the foregoing, it will now be seen that there is herein provided an improved bracket for truck mirrors or the like which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein shown and described is to be interpreted merely as illustrative and not in a limiting sense.

What is claimed is:

1. A mounting bracket for a rear view mirror, comprising in combination, an upper support adapted to be attached to a vehicle and including a horizontal semicircular plate, a lower support adapted to be attached to a vehicle body in vertical alignment with the upper support and including a semi-circular plate, a mirror supporting frame including an upper horizontal arm, a lower horizontal arm and a vertical bight connecting the outer ends of said arms, a clevis on the inner end of each arm, means pivotally connecting the clevis on said upper arm on opposite sides of the plate of the upper support, means pivotally connecting the clevis on said lower arm on opposite sides of the plate of the lower support swinging said mirror supporting frame about a substantially vertical axis, and means mounting a mirror in pivotal relation between said upper and lower arms.

2. The structure of claim 1 wherein resilient means are provided for releasably securing said frame in a selected position of adjustment relative to said vertical axis.

3. The structure of claim 1 wherein said upper horizontal plate is provided with a plurality of annular recesses, and a leaf spring having a detent thereon is pivotally mounted on the mounting of the upper clevis for rotation therewith, said detent selectively engaging in one of said recesses to retain said frame in a selected position of adjustment.

4. The structure of claim 1 wherein the upper leg of the lower clevis is provided with an opening therein, a leaf spring having a detent on its lower side is mounted on the pivot of said lower clevis for rotation therewith, a detent is provided on the under side of said spring, said lower plate has a recess therein in which said detent engages, and a finger, connected to said leaf spring extends upwardly through said opening whereby movement of said finger releases said detent from said recess.

5. The structure of claim 4 wherein indicia are provided on the upper surface of said lower plate for indicating the angular inclination of said frame.

6. The structure of claim 1 wherein clamps are mounted on said upper and lower arms, each clamp having an extension provided with a plurality of openings, and the mirror is provided with end pins adapted to be mounted in selected ones of said openings.

7. The structure of claim 1 wherein the pivotal mounting of the lower arm is outwardly offset relative to the pivotal mounting of the upper arm whereby upon rotative movement of said frame, said frame tilts downwardly.

8. A mounting bracket for a rear view mirror comprising in combination, fixed upper and lower supports adapted to be secured to the side of a vehicle body, quadrants on said supports, a C-frame including upper and lower legs each having a clevis on its free end, with the clevises pivotally connected about said plates for pivotal movement of said frame about a vertical axis, resilient means associated with at least one clevis and its adjacent plate for retaining said frame in a selected rotative position, and a mirror carried by said C-frame.

References Cited by the Examiner

UNITED STATES PATENTS

| 1,921,310 | 8/1933 | Crisman | 248—285 |
| 2,506,824 | 5/1950 | Brown et al. | 248—42 |
| 2,969,715 | 1/1961 | Mosby | 88—98 |
| 3,119,591 | 1/1964 | Maleckie | 248—282 |

FOREIGN PATENTS

| 1,044,098 | 6/1953 | France. |

CLAUDE A. LE ROY, *Primary Examiner.*

KLAAS J. WINGERT, *Assistant Examiner.*